3,721,661
PROCESS FOR PRODUCING POLYISOBUTENE
Ermanno Susa, 44 Via Dei Navali, Trieste, Italy
No Drawing. Continuation-in-part of application Ser. No. 37,452, May 15, 1970, and a continuation of application Ser. No. 610,254, Jan. 19, 1967, now abandoned. This application May 5, 1971, Ser. No. 140,570
Claims priority, application Italy, Jan. 25, 1966, 13,774/66
Int. Cl. C08f 3/14
U.S. Cl. 260—94.8        3 Claims

ABSTRACT OF THE DISCLOSURE

Process for regulating the molecular weight of polyisobutene and producing high polymer yields by using tert. butyl chloride as the molecular weight regulator during the polymerization of isobutene in the presence of a Friedel-Crafts catalyst and a solvent having a low dipole moment.

CROSS-REFERENCE TO RELATED APPLICATIONS

This application is a continuation-in-part of application Ser. No. 37,452, filed May 15, 1970, which application is in turn a continuation of application Ser. No. 610,254, filed Jan. 19, 1967, both now abandoned.

BACKGROUND OF THE INVENTION

(1) Field of the invention

The present invention relates to a new process of producing polyisobutene. More particularly, it relates to the use of tertiary butyl chloride as the molecular weight regulator during the polymerization and carrying out the reaction in a solvent having a low dipole moment.

(2) Description of the prior art

Generally, in the polymerization of isobutene with cationic catalysts, the molecular weight of the product has been regulated by the temperature at which the polymerization is carried out, the molecular weight decreasing with increase in temperature.

In addition, the presence of even small amounts of certain olefins, such as butene-1, and butene-2, and of certain diolefins, such as butadiene and isoprene, in the isobutene, causes a decrease in the molecular weight, which decrease is a direct function of the concentration of such olefins or diolefins. This same effect is also caused by the presence of dimers, trimers and other low molecular weight polymers (oligomers) of isobutene. Such substances, however, cannot be used as molecular weight regulators because they tend to markedly diminish the reaction rate, even when they are present in only small amounts.

Previously, the only practical method for regulating the molecular weight was by controlling the temperature at which the reaction took place. Such a system, however, can become technically complicated. Thus, if one wanted to produce the full range of polymers having a molecular weight between 2,000 and 4,000,000 in the same apparatus, it would be necessary to change the cooling fluid of the cooling apparatus depending upon the temperature range necessary to produce the desired molecular weight. In fact, the use of a single cooling fluid, for the temperature range of from —120° C. to +20° C., involves high compression costs and requires an apparatus which is resistant to high pressure.

SUMMARY OF THE INVENTION

I have now surprisingly found a process for regulating the molecular weight of polyisobutene so as to obtain greater than about 80% yields of polymers having an intrinsic viscosity varying from 0.05 to 4. The present invention resides in adding small amounts of tert.butyl chloride, varying between about 0.5 and 4,000 p.p.m. or even as much as 5,000 p.p.m. (parts per million), based on the total weight of the charge (solvent+monomer +catalyst), to the reactants and carrying out the reaction in a solvent having a dipole moment less than 0.9. All the other conditions being equal, the molecular weight of the polymer decreases as the amount of tert. butyl chloride added increases when the polymerization is conducted at temperatures below 0° C.

DESCRIPTION OF THE PREFERRED EMBODIMENTS

The tert.butyl chloride,

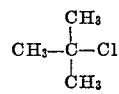

(2-chloro-2-methyl-propane or 2-chloro-isobutane), can be readily obtained, for example, by reacting aqueous HCl and tert.butyl alcohol (Vogel-Textbook of Organic Chemistry—London, Longmans (1961)—page 276); by reacting chlorine with isobutene at a temperature of from —60° C. to —40° C. (Ind. Eng. Chem. 31 (1939) 1418); by reacting isobutene and HCl at a temperature of about —78.5° C. (Can. J. Res. 2 (1930) 272); by chlorination of paraffins (Ind. Eng. Chem. 27 (1935) 1193).

The present process for regulating the molecular weight of polyisobutene can also be applied to the adiabatic polymerization method described in Italian Patent 697,440.

Friedel-Crafts catalysts suitable for use in the present invention include aluminum ethyl dichloride and aluminum trichloride.

Solvents suitable for use in the process of the present invention include those solvents normally used for isobutene polymerization reactions and which have dipole moments of less than 0.9. Preferred solvents are petroleum ether, toluene and carbon disulfide. Most preferably, the solvent has a dipole moment of zero, e.g., petroleum ether (mixed pentanes) or carbon disulfide.

The following examples are presented to further illustrate the present invention without limiting the scope thereof.

EXAMPLE 1

The solvent was a mixture of pentanes (the $C_5$ fraction obtained from petroleum cracking) having a dipole moment of 0 which had been washed with concentrated sulfuric acid, neutralized with NaOH and dried over $Al_2O_3$. The solvent contained 15-30 p.p.m. of water.

The monomer used was 99.2% isobutene, containing less than 0.3% of unsaturated $C_4$ hydrocarbons.

The catalyst, aluminum ethyl dichloride, was prepared in heptane by reacting $AlEt_2Cl$ with $AlCl_3$. The solution obtained after the reaction had an $AlEtCl_2$ concentration of 1.5 g. per 100 cc. and an atomic Cl/Al ratio of 1.99.

The tert.butyl chloride used as chain transfer agent or molecular weight regulator was prepared by reacting tert. butyl alcohol with aqueous hydrochloric acid (according to Vogel).

The tests were carried out under adiabatic conditions, i.e., no heat was supplied to or removed from the system during the polymerization. The solvent, the tert.butyl chloride transfer agent (in technical pentane solution), and the monomer were introduced into a 500 cc. reaction flask. Then the flask was cooled to the initial reaction temperature and placed in a Dewar vessel to provide insulation. Finally, the catalyst (74 mg. in 3 cc. of pentane) was added with agitation. The amount of solvent used in each test was 320 cc. (density 0.65), including the amount used as medium for the transfer agent and the catalyst.

90 seconds after the addition of the catalyst, the reaction was stopped by adding 3 cc. of isobutyl alcohol. The polymer was then separated from the solvent by steam treatment and dried at 50° C. under vacuum for 24 hours. In each case a conversion of 99–100% was obtained.

The following tables show, for a specified initial temperature, the variation of the intrinsic viscosity (I.V.) and of the corresponding molecular weight (M.W.), calculated according to Scott, Carter, and Magat (J.A.C.S. 71 (1949) 220), by varying thhe concentration of tert.-butyl chloride (t.-BuCl), expressed as p.p.m. by weight based on the weight of the total mixture. A slight variation of the M.W. by varying the concentration of the monomer (expressed in percent by weight based on the mixture of solvent+monomer) was also observed.

TABLE 1.—TESTS AT −80° C.

| Test number: | t-BuCl, p.p.m. | iC$_4$H$_8$, percent | I.V. | M.W., ×10⁻³ |
|---|---|---|---|---|
| 1 | 0 | 10 | 2.36 | 1,510 |
| 2 | 1 | 10 | 1.98 | 1,130 |
| 3 | 3 | 10 | 1.78 | 950 |
| 4 | 10 | 10 | 1.19 | 494 |
| 5 | 30 | 10 | 0.86 | 293 |
| 6 | 100 | 10 | 0.62 | 173 |
| 7 | 1,000 | 10 | 0.31 | 57 |
| 8 | 0 | 20 | 1.51 | 727 |
| 9 | 0.3 | 20 | 1.51 | 727 |
| 10 | 1 | 20 | 1.43 | 669 |
| 11 | 2 | 20 | 1.23 | 521 |
| 12 | 4 | 20 | 1.12 | 444 |
| 13 | 7 | 20 | 0.98 | 364 |
| 14 | 10 | 20 | 0.88 | 304 |
| 15 | 30 | 20 | 0.66 | 191 |
| 16 | 70 | 20 | 0.57 | 151 |
| 17 | 100 | 20 | 0.46 | 107 |
| 18 | 200 | 20 | 0.43 | 96 |
| 19 | 300 | 20 | 0.40 | 86 |
| 20 | 600 | 20 | 0.31 | 57 |
| 21 | 1,200 | 20 | 0.23 | 35 |
| 22 | 2,400 | 20 | 0.18 | 24 |

TABLE 2.—TESTS AT −60° C.

| Test number: | t-BuCl, p.p.m. | iC$_4$H$_8$, percent | I.V. | M.W., ×10⁻³ |
|---|---|---|---|---|
| 23 | 0 | 20 | 0.6 | 165 |
| 24 | 300 | 20 | 0.25 | 40 |
| 25 | 600 | 20 | 0.17 | 22 |
| 26 | 1,200 | 20 | 10.3 | 14 |
| 27 | 2,400 | 20 | 0.09 | N.d. |

See note at end of Table 5.

TABLE 3.—TESTS AT −50° C.

| Test number: | t-BuCl, p.p.m. | iC$_4$H$_8$, percent | I.V. | M.W., ×10⁻³ |
|---|---|---|---|---|
| 28 | 0 | 10 | 0.82 | 270 |
| 29 | 1 | 10 | 0.70 | 210 |
| 30 | 3 | 10 | 0.61 | 170 |
| 31 | 10 | 10 | 0.50 | 123 |
| 32 | 30 | 10 | 0.34 | 67 |
| 33 | 100 | 10 | 0.24 | 39 |

TABLE 4.—TESTS AT −40° C.

| Test number: | t-BuCl, p.p.m. | iC$_4$H$_8$, percent | I.V. | M.W., ×10⁻³ |
|---|---|---|---|---|
| 34 | 0 | 20 | 0.37 | 76 |
| 35 | 75 | 20 | 0.22 | 33 |
| 36 | 150 | 20 | 0.17 | 22 |
| 37 | 300 | 20 | 0.155 | 21 |
| 38 | 600 | 20 | 0.099 | N.d. |
| 39 | 1,200 | 20 | 0.097 | N.d. |
| 40 | 2,400 | 20 | 0.072 | N.d. |
| 41 | 4,800 | 20 | 0.062 | N.d. |

TABLE 5.—TESTS AT −30° C.

| Test number: | t-BuCl, p.p.m. | iC$_4$H$_8$, percent | I.V. | M.W., ×10⁻³ |
|---|---|---|---|---|
| 42 | 0 | 20 | 0.27 | 45 |
| 43 | 250 | 20 | 0.14 | 16 |
| 44 | 600 | 20 | 0.09 | N.d. |

NOTE.—N.d. (not determinable) means that the M.W. cannot be measured accurately as a function of the I.V. at these readings.

EXAMPLE 2

Twelve series, each consisting of either three or four isobutene polymerization reactions, were carried out with monomeric isobutene (99.2%, containing less than 0.3% unsaturated $C_4$ hydrocarbons). For each series, the catalyst was either aluminum trichloride or aluminum ethyldichloride. The series were carried out using a variety of solvents having dipole moments ranging from 0 to 1.98. The tertiary butyl chloride concentration within each series was varied from 0 to 500 p.p.m.

The polymerization reactions were carried out as follows: The solvent, tertiary butylchloride (when used), and isobutene monomer were introduced into a 500 cc. reaction flask. The flask was cooled to about −80° C. and placed in a Dewar vessel to provide insulation. When the catalyst was aluminum ethyldichloride, it was introduced to the reaction mixture in the form of 3 cc. of a solution of 74 milligrams of the catalyst in petroleum ether. When the catalyst was aluminum trichloride, it was introduced by first dissolving the catalyst in 100 cc. of ethylchloride. This solution was then introduced to the reaction mixture in an amount corresponding to 74–78 mg. of catalyst.

In each case, the amount of solvent used was 320 cc., the amount of isobutene introduced was 23 grams, the reaction temperature was −80° C., and the reaction was terminated 90 seconds after adding the catalyst by the addition of 20 cc. of isobutyl alcohol. After termination of the reaction, the polymer was separated from the solvent by steam treatment and dried at 50° C. under vacuum for 24 hours.

The intrinsic viscosity ($\mu$) of the polymer product was determined in accordance with the method of T. G. Fox and P. J. Florey, Journal Phys. Colloid Chemistry, 53 (1949), page 197. The intrinsic viscosity-molecular weight relationship is given by the formula $$\mu = 20 \times 10^{-5} \times M^{0.67}$$

wherein M is the molecular weight.

The amounts of tertiary butylchloride, catalyst and solvent used, as well as the yields and viscosities of the products obtained from each series of reactions are set out in Table 6.

TABLE 6

| Tertiary butyl chloride, p.p.m. | Catalyst, AlEtCl₂ | | | | Catalyst, AlCl₃ | | |
|---|---|---|---|---|---|---|---|
| | Grams polymer | Conversion, percent | I.V. (F) | | Grams polymer | Conversion, percent | I.V. (μ) |
| Series 1, petroleum ether (dipole moment=0.0) | 21 | 92 | 0.9 | Series 2, petroleum ether | 20 | 88 | 1 |
| 50 | 21 | 92 | 0.8 | | 21 | 92 | 0.4 |
| 100 | | | | | | | |
| 500 | 21 | 92 | 0.3 | | 21 | 92 | 0.3 |
| Series 3, toluene (dipole moment=0.39) | 15 | 65.2 | 1.16 | Series 4, toluene | 20.3 | 88.2 | 0.53 |
| 50 | 19.5 | 85 | 0.3 | | 20.5 | 89 | 0.27 |
| 100 | 19.6 | 85.2 | 0.27 | | 20.4 | 88.7 | 0.25 |
| 500 | 18.8 | 82 | 0.18 | | 20.2 | 88 | 0.15 |
| Series 5, carbon disulfide (dipole moment=0.0) | 1.3 | 5.65 | 1.3 | Series 6, carbon disulfide | 21 | 91.3 | 1.4 |
| 50 | 19 | 82.5 | 0.7 | | 21 | 91.3 | 0.5 |
| 100 | 19.5 | 84.8 | 0.5 | | 20.5 | 89.1 | 0.46 |
| 500 | 20 | 87 | 0.35 | | 21.5 | 93.5 | 0.27 |
| Series 7, ethylene trichloride (dipole moment =0.9) | 3.8 | 16.5 | 1.55 | Series 8, ethylene trichloride | 15.5 | 67.5 | 0.6 |
| 50 | 4.7 | 20.5 | 0.55 | | 15.5 | 67.5 | 0.58 |
| 100 | 14.6 | 63.5 | 0.5 | | 14.5 | 63 | 0.4 |
| 500 | 18.6 | 81 | 0.4 | | 15 | 65.2 | 0.27 |
| Series 9, methylene chloride (dipole moment =1.55) | 1.2 | 5.2 | 0.5 | Series 10, methylene chloride | 1.5 | 6.5 | 0.6 |
| 50 | 1.7 | 7.38 | 0.41 | | 4.5 | 19.5 | 0.31 |
| 100 | 1.7 | 7.38 | 0.38 | | 4.5 | 19.5 | 0.27 |
| 500 | 1.8 | 7.82 | 0.26 | | 4.7 | 20.4 | 0.21 |
| Series 11, ethylchloride (dipole moment=1.98) | 18 | 79 | 1 | Series 12, ethylchloride | 19 | 83 | 0.7 |
| 50 | 19 | 83 | 0.4 | | 20 | 88 | 0.4 |
| 100 | | | | | | | |
| 500 | 16 | 70 | 0.1 | | 17 | 74 | 0.1 |

As shown in Table 6, when the polymerization reaction is carried out in accordance with the process of the present invention, i.e., in the presence of an inert solvent having a dipole moment less than 0.9 (Series 1–6), the polyisobutene yield always exceeds 80%, regardless of the amount of tertiary butyl chloride used to control the molecular weight of the product.

In contrast, when the dipole moment of the solvent is 0.9 or above (Series 7–12), yields in excess of 80% of low molecular weight products are either not obtained or can be obtained only in selected situations—there is no predictable pattern. Thus, in Series 7, the yield of the product possessing an intrinsic viscosity of 0.55 is undesirably low. The yield of product increases only to satisfactory levels, i.e., above 80%, when 500 p.p.m. of tertiary butyl chloride are used. However, the product obtained using this concentration of tertiary butyl chloride has an intrinsic viscosity of 0.4. Consequently, if it were desired to produce polyisobutene having a molecular weight corresponding to an intrinsic viscosity greater than 0.4, the ethylene trichloride solvent, having a dipole moment of 0.9, could not be used.

A comparison of Series 7 with Series 8 indicates that at this high level of dipole moment the reaction can become catalyst sensitive. Thus, in Series 8, wherein aluminum trichloride is the catalyst, the yield never exceeds the undesirably low level of 67.5 and is practically constant regardless of the tertiary butyl chloride level or the molecular weight of the product. In the same solvent, however, using a different catalyst, namely, aluminum ethyldichloride (Series 7), satisfactory yields can be obtained, but only for low molecular weight products. Moreover, the yield varies markedly with the tertiary butyl chloride level.

As the dipole moment of the solvent is increased to values greater than 0.9, other deleterious effects are observed. In Series 9 and 10, wherein the solvent is ethylene chloride, having a dipole moment of 1.55, the product yields are extremely poor regardless of the catalyst used. In Series 11 and 12, wherein the solvent is ethyl chloride, having a dipole moment of 1.98, although the yields of high molecular weight products are satisfactory, the yield increases slightly in the presence of 50 p.p.m. of tertiary butyl chloride and then decreases substantially with increasing tertiary butyl chloride levels (and decreasing molecular weight of the product).

Thus, when the dipole moment of the solvent is less than 0.9, high yields, i.e., greater than 80%, of high and low molecular weight products are always obtained regardless of the catalyst used or the amount of tertiary butyl chloride added. When the dipole moment of the solvent is 0.9 or greater, deleterious effects are observed, and there is no predictability to the results—it is not always possible to achieve satisfactory yields or conversion rates at any desired molecular weight level.

Variations can, of course, be made without departing from the spirit and scope of my invention.

Having thus described my invention, what I desire to secure by Letters Patent and hereby claim is:

1. In a process for producing polyisobutene having an intrinsic viscosity in the range of from about 0.05 to about 4 which comprises polymerizing isobutene in an inert solvent at temperatures in the range of about 0° C. to —80° C., in the presence of ethyl aluminum dichloride as a catalyst, an improvement comprising employing as the inert solvent, a solvent having a dipole moment of from zero to 0.39, said solvent being selected from the group consisting of petroleum ether and toluene and controlling the molecular weight of the resulting polyisobutene while achieving a conversion rate in exces of 80% by adding to the reaction mixture from about 0.5 to 5,000 p.p.m. by weight, based on the weight of the reaction mixture, of tertiary butyl chloride, the molecular weight of the polyisobutene product decreasing as the concentration of said tertiary butyl chloride in said reaction mixture increases.

2. The process of claim 1 wherein the dipole moment of the solvent is zero.

3. The process of claim 2 wherein the solvent is petroleum ether.

References Cited

UNITED STATES PATENTS 2,581,154  1/1952  Walsh et al. .......... 260—85.3
3,123,592  3/1964  Gasparoni et al. ..... 260—94.8

OTHER REFERENCES

Olah "Friedel-Crafts and Related Reactions," Interscience Publishers, vol. I, New York, N.Y., 1963.

HARRY WONG, Jr., Primary Examiner

S. M. LEVIN, Assistant Examiner

UNITED STATES PATENT OFFICE
CERTIFICATE OF CORRECTION

Patent No. 3,721,661          Dated March 20, 1973

Inventor(s) Ermanno Susa

It is certified that error appears in the above-identified patent and that said Letters Patent are hereby corrected as shown below:

Column 1, between lines 3 and 4 read read: -- assignor to Montecatini Edison S.p.A., Milan, Italy--.

Column 3,
Table 2, Test No. 26, under "I.V.": "10.3" should read -- 0.13 --.

Column 5-6, Table 6, in the heading: "I.V." should read -- I.V. --.
                                          (f)
    (µ)

Column 5-6, Table 6, Series 9: "=1.55)." should read -- 1.55). --.

Signed and sealed this 25th day of June 1974.

(SEAL)
Attest:

EDWARD M. FLETCHER, JR.          C. MARSHALL DANN
Attesting Officer                 Commissioner of Patents